(12) United States Patent
Smith et al.

(10) Patent No.: US 7,309,107 B2
(45) Date of Patent: Dec. 18, 2007

(54) INTERNAL REINFORCEMENT BRACKET FOR A SEAT TRACK ASSEMBLY

(75) Inventors: Jason C. Smith, Cedar Valley (CA); Peter J. Famiglietti, Barrie (CA)

(73) Assignee: Intier Automotive Inc., Aurora, Ontario (CA)

( * ) Notice: Subject to any disclaimer, the term of this patent is extended or adjusted under 35 U.S.C. 154(b) by 217 days.

(21) Appl. No.: 10/513,313

(22) PCT Filed: May 5, 2003

(86) PCT No.: PCT/US03/13846

§ 371 (c)(1),
(2), (4) Date: May 18, 2005

(87) PCT Pub. No.: WO03/093053

PCT Pub. Date: Nov. 13, 2003

(65) Prior Publication Data

US 2005/0230591 A1    Oct. 20, 2005

Related U.S. Application Data

(60) Provisional application No. 60/377,690, filed on May 3, 2002.

(51) Int. Cl.
*F16M 13/00* (2006.01)
(52) U.S. Cl. .................. 297/344.11; 248/429; 248/430
(58) Field of Classification Search ........... 297/344.11; 248/429, 430
See application file for complete search history.

(56) References Cited

U.S. PATENT DOCUMENTS

| | | | |
|---|---|---|---|
| 4,072,347 A * | 2/1978 | Boisset | 248/429 X |
| 4,756,503 A * | 7/1988 | Fujita | 248/430 |
| 5,213,300 A * | 5/1993 | Rees | 248/429 |
| 5,370,350 A * | 12/1994 | Okano et al. | 248/430 |
| 5,407,166 A * | 4/1995 | Pilarski | 248/430 |
| 5,454,541 A | 10/1995 | Ito | |
| 5,524,504 A | 6/1996 | Brandoli et al. | |
| 5,641,146 A * | 6/1997 | Hoshihara et al. | 248/430 |
| 5,645,318 A * | 7/1997 | Allison | 248/430 X |
| 5,741,000 A | 4/1998 | Goodbred | |
| 5,746,409 A * | 5/1998 | Rees | 248/429 X |

(Continued)

FOREIGN PATENT DOCUMENTS

DE    4304107    9/1993

(Continued)

*Primary Examiner*—Rodney B. White
(74) *Attorney, Agent, or Firm*—Clark Hill PLC

(57) ABSTRACT

A seat track assembly for providing fore and aft movement of a seat along a floor of a motor vehicle includes a lower track fixedly secured to the floor. The seat track assembly also includes an upper track slidingly engaging the lower track and defining an internal channel there between. The upper track is coupled to the seat and allows for sliding movement of the seat along the lower track. In addition, the seat track assembly includes an anchor seated within the internal channel and fixedly secured to the lower track. In addition, the seat track assembly includes a reinforcement bracket seated within the internal channel and fixedly secured to the upper track. The reinforcement bracket selectively engages the anchor in response to a predetermined load to control deformation and prevent separation between the upper and lower tracks.

8 Claims, 4 Drawing Sheets

U.S. PATENT DOCUMENTS

| | | | |
|---|---|---|---|
| 5,755,422 A | | 5/1998 | Susko et al. |
| 5,893,545 A | * | 4/1999 | Lyons et al. ................. 248/420 |
| 5,918,846 A | * | 7/1999 | Garrido ....................... 248/429 |
| 5,957,535 A | * | 9/1999 | Pasternak et al. ....... 248/429 X |
| 5,961,088 A | * | 10/1999 | Chabanne et al. .......... 248/429 |
| 5,961,089 A | | 10/1999 | Soisnard |
| 6,089,521 A | | 7/2000 | Tarusawa et al. |
| 6,116,561 A | | 9/2000 | Christopher |
| 6,155,626 A | * | 12/2000 | Chabanne et al. ....... 296/65.03 |
| 6,349,914 B1 | | 2/2002 | Yoshida et al. |
| 6,352,312 B1 | * | 3/2002 | Rees ...................... 248/429 X |

FOREIGN PATENT DOCUMENTS

| | | | |
|---|---|---|---|
| DE | 4318943 A1 | * | 12/1994 |
| EP | 90235 A2 | * | 10/1983 |
| EP | 0697306 | | 2/1996 |
| FR | 2728203 | | 6/1996 |
| FR | 2811946 | | 1/2002 |
| GB | 2275187 A | * | 8/1994 |
| JP | 03104741 A | * | 5/1991 |
| JP | 06191328 A | * | 7/1994 |

* cited by examiner

INTERNAL REINFORCEMENT BRACKET FOR A SEAT TRACK ASSEMBLY

CROSS-REFERENCE TO RELATED APPLICATION

This patent application claims the benefit of U.S. Provisional Application Ser. No. 60/377,690 filed on May 3, 2002 and entitled "Internal Reinforcement Bracket for a Track Assembly."

BACKGROUND OF THE INVENTION

1. Field of the Invention

This invention relates to a seat track assembly for a seat of a motor vehicle. More particularly, the invention relates to a reinforcement bracket for controlling deformation and preventing separation between upper and lower tracks of a seat track assembly during a motor vehicle impact.

2. Description of the Related Art

A motor vehicle includes a plurality of seats positioned throughout a passenger compartment for supporting motor vehicle occupants. Each seat includes a generally horizontal seat cushion, and a generally upright seat back operatively coupled to the seat cushion to allow for pivotal adjustment of the seat back relative to the seat cushion between a plurality of reclined seating positions.

A seat track assembly is typically mounted to a bottom surface of the seat cushion and provides fore and aft movement of the seat within the motor vehicle. The seat track assembly includes a lower track secured to a floor of the motor vehicle and an upper track slidably engaging the lower track. The upper track is fixedly secured to the bottom surface of the seat cushion to allow for sliding movement of the seat along the lower track. A locking mechanism is operatively coupled between the upper and lower tracks for selectively locking the position of the upper track relative to the lower track. The locking mechanism is either a continuously engaged lock utilizing a lead screw positioner, or a non-continuously engaged lock utilizing a rack of teeth lockingly engagable with apertures formed in the lower track. The occupant actuates or unlocks the locking mechanism to adjust the seat to an optimal pedal and steering wheel position.

During a motor vehicle impact, loads associated with the weight of the seat and the occupant are transferred to the floor via the seat track assembly. This load transfer causes the upper and lower tracks to move away from one another, causing the seat track assembly to deform. As a result of this deformation, servicing of the seat track assembly is required to allow for the sliding movement of the upper track, and with it the seat, along the lower track.

U.S. Pat. No. 5,961,089 to Soisnard discloses a seat track assembly including a retention part for reducing the amount of separation between an upper track and a lower track during a motor vehicle impact. The seat track assembly includes the lower track fixedly secured to a floor of a motor vehicle and the upper track, which is movable relative to the fixed lower track, supporting a seat cushion thereabove. The upper track is U-shaped and includes two spaced apart vertical flanges extending downwards from a generally horizontal wall. The retention part is located proximate to a rear portion of the lower track. The retention part includes a first flange abutting a bottom part of the lower track and attached thereto by a rivet, and a second flange extending vertically from the first flange to a position between the spaced apart vertical flanges of the upper track. The second flange includes a pointed tooth extending out from each side thereof towards the spaced apart vertical flanges of the upper track. When the upper track is subjected to a high upward load, for example, during a motor vehicle impact, the upper track is moved upwards. As a result, the spaced apart vertical flanges of the upper track move toward one another until each of the spaced apart vertical flanges comes into contact with one of the pointed teeth. The pointed teeth bite into the spaced apart vertical flanges and are anchored thereto, thus preventing any further upward movement of the upper track relative to the lower track.

SUMMARY OF THE INVENTION

A seat track assembly for providing fore and aft movement of a seat along a floor of a motor vehicle includes a lower track fixedly secured to the floor. The seat track assembly also includes an upper track slidingly engaging the lower track and defining an internal channel therebetween. The upper track is coupled to the seat and allows for sliding movement of the seat along the lower track. In addition, the seat track assembly includes an anchor seated within the internal channel and fixedly secured to the lower track. In addition, the seat track assembly includes a reinforcement bracket seated within the internal channel and fixedly secured to the upper track. The reinforcement bracket selectively engages the anchor in response to a predetermined load to control deformation and prevent separation between the upper and lower tracks.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
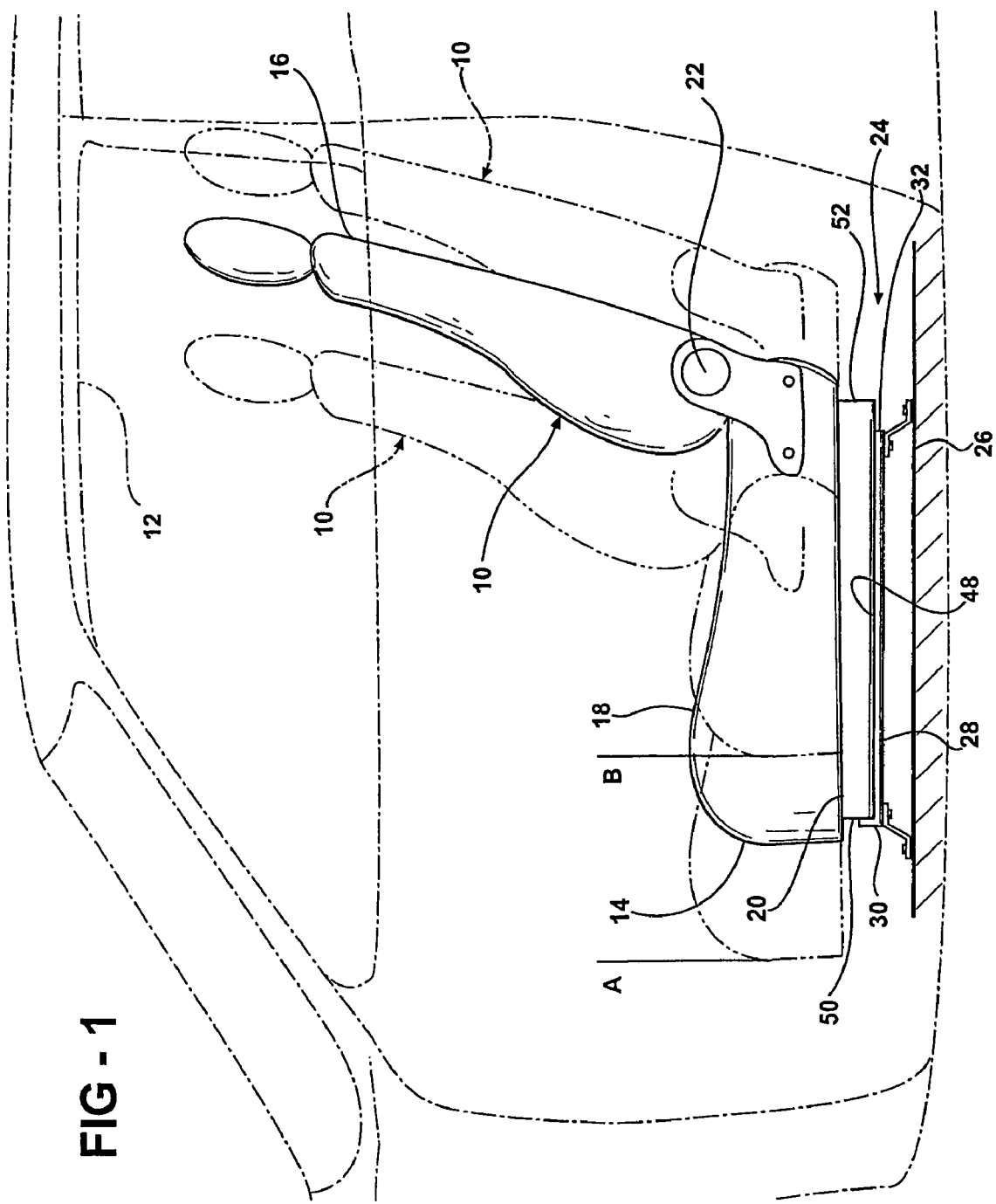
FIG. 1 is a side view of a seat of a motor vehicle incorporating a seat track assembly according to the invention.

Referring to FIG. 1, a seat, generally indicated at 10, for supporting an occupant within a motor vehicle 12 includes a generally horizontal seat cushion 14 and a generally upright seat back 16. The seat cushion 14 includes a seating surface 18 and a bottom surface 20 opposite thereto. The seat back 16 is operatively coupled to the seat cushion 14 by a recliner mechanism 22 to provide pivotal adjustment of the seat back 16 relative to the seat cushion 14 between a plurality of reclined positions.

A seat track assembly, generally shown at 24, is positioned between the bottom surface 20 of the seat cushion 14 and a floor 26 of the motor vehicle 12. The seat track assembly 24 allows for fore and aft adjustment of the seat 10 between a full forward position, indicated at A, a full rearward position, indicated at B, and a plurality of intermediate positions therebetween (one of which is shown in solid line in FIG. 1).

Figure 2:
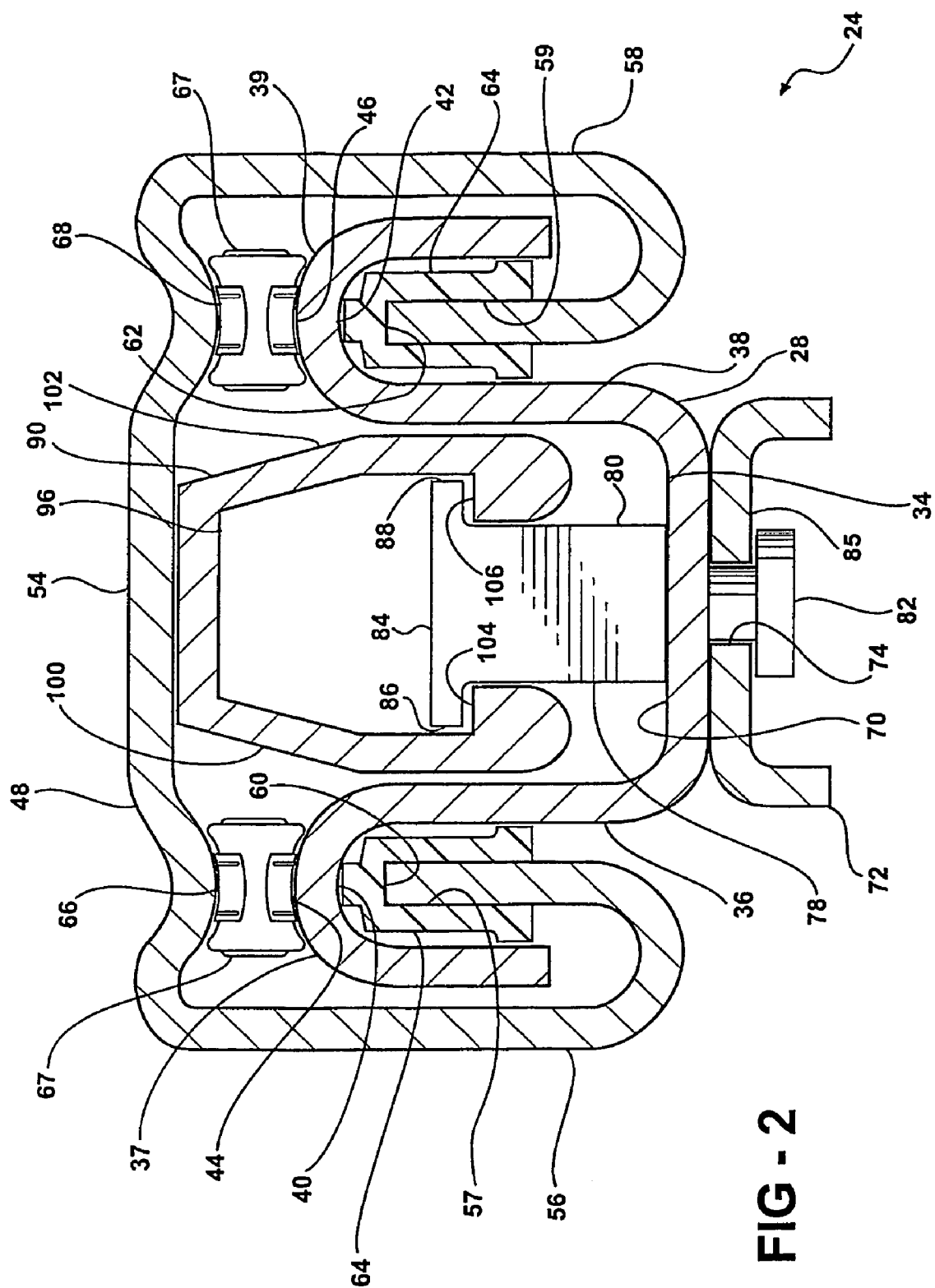
FIG. 2 is a cross-sectional front view of the seat track assembly.

The seat track assembly 24 includes a lower track 28 extending longitudinally between fore 30 and aft 32 ends. Referring to FIG. 2, the lower track 28 has a cross section defined by a generally horizontal lower wall 34 extending between spaced apart inner side walls 36, 38. The inner side walls 36, 38 each include an end portion 37, 39 extending laterally outwardly therefrom. Each of the inner side walls 36, 38 presents an inner bearing surface 40, 42 and an outer bearing surface 44, 46 extending longitudinally between the fore and aft 32 ends of the lower track 28.

Referring once again to FIG. 1, the seat track assembly 24 also includes an upper track 48 extending longitudinally between fore 50 and aft 52 ends. Referring to FIG. 2, the upper track 48 has a cross section defined by a generally horizontal upper wall 54 spaced apart from the lower wall 34 of the lower track 28 and extending between spaced apart outer side walls 56, 58. Each of the outer side walls 56, 58 includes a respective end portion 57, 59 extending laterally inwardly therefrom. Each end portion 57, 59 terminates at a respective distal edge 60, 62 extending longitudinally between the fore 50 and aft 52 ends of the upper track 48.

The inner side walls 36, 38 of the lower track 28 interlock the outer side walls 56, 58 of the upper track 48. More specifically, the distal edges 60, 62 of the outer side walls 56, 58 are nested within the end portions 37, 39 of the inner side walls 36, 38 for sliding engagement with the inner bearing surfaces 40, 42 thereof. Bushings 64 are fixedly secured along the distal edges 60, 62 to minimize tolerance gaps and wear between the distal edges 60, 62 and the respective inner bearing surfaces 40, 42.

The upper wall 54 extends along a predetermined length and includes arcuate bearing surfaces 66, 68 extending longitudinally between the fore 50 and aft 52 ends of the upper track 48. The arcuate bearing surfaces 66, 68 correspond laterally with the outer bearing surfaces 44, 46 of the lower track 28. A plurality of roller bearings 67 is disposed between the arcuate bearing surfaces 66, 68 of the upper track 48 and the respective outer bearing surfaces 44, 46 of the lower track 28 to provide smooth fore and aft movement of the upper track 48 along the lower track 28.

Figure 3:
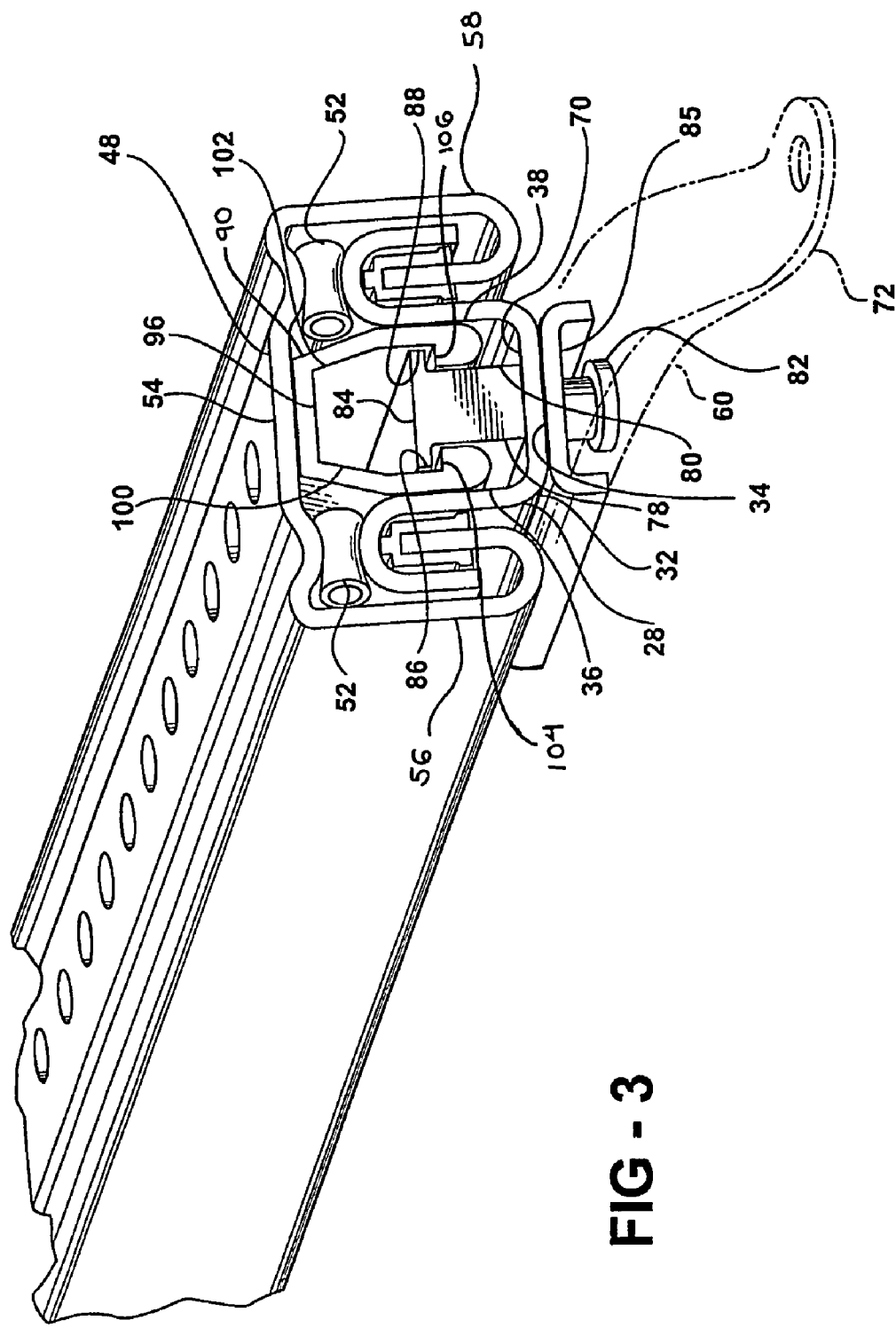
FIG. 3 is a perspective view, partially cut away, of the seat track assembly.

Referring to FIGS. 2 and 3, a track foot 72 is fixedly secured to the aft end 32 of the lower track 28 to mount the lower track 28 to the floor 26 of the motor vehicle 12. The track foot 72 includes apertures 74 that are aligned with apertures (not shown) extending through the lower wall 34 of the lower track 28.

The lower 28 and upper 48 tracks define an internal channel 70 extending longitudinally therebetween. The internal channel 70 extends vertically between the lower wall 34 of the lower track 28 and the upper wall 54 of the upper track 48. In addition, the internal channel 70 extends laterally between the inner side walls 36, 38 of the lower track 28.

An anchor 78 is fixedly secured to the lower track 28 and includes a base 80 extending between a securing end 82 and an upper end 84. The securing end 82 of the anchor 78 is plastically deformed by a spinning operation against a bottom surface 85 of the track foot 72 to retain the track foot 72 and the lower wall 34 between the securing 82 and upper 84 ends. The upper end 84 of the anchor 78 is seated within the internal channel 70 and includes laterally outwardly extending locking tabs 86, 88. In a preferred embodiment, more than one anchor 78 is secured to the lower track 28, and the anchors 78 are longitudinally spaced apart from one another.

Figure 4:
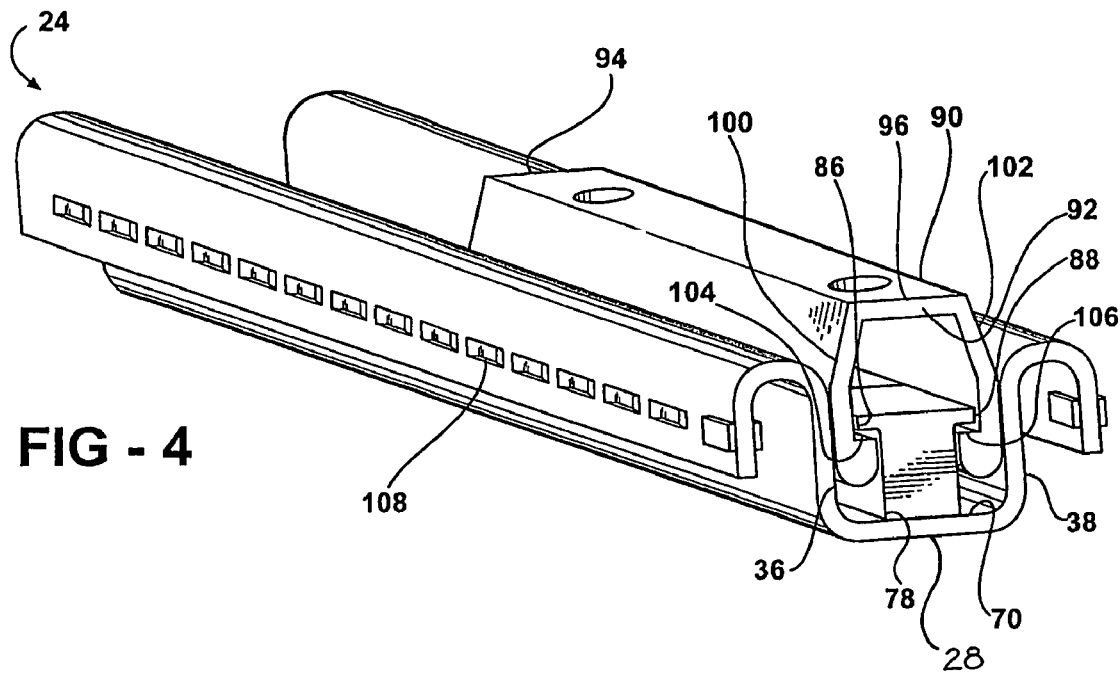
FIG. 4 is an isolated perspective view of a lower track of the seat track assembly and a reinforcement bracket positioned within the lower track.
Figure 5:
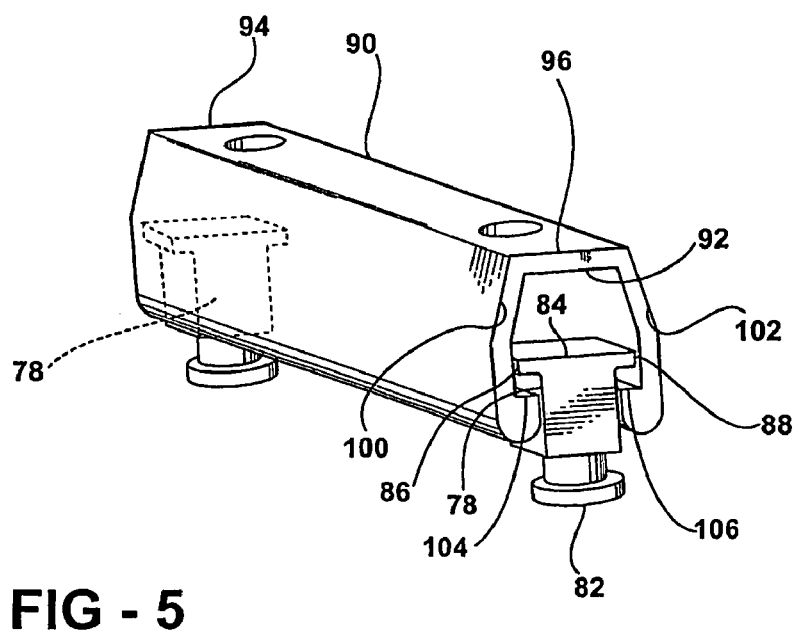
FIG. 5 is an isolated perspective view of the reinforcement bracket having spaced apart hooks, and anchors positioned between the spaced apart hooks.

Referring to FIGS. 4 and 5, the seat track assembly 24 includes a reinforcement bracket 90 extending longitudinally between fore 92 and aft 94 ends. The reinforcement bracket 90 is seated within the internal channel 70 between the inner side walls 36, 38, as shown in FIGS. 2 and 3. The reinforcement bracket 90 includes a top wall 96 disposed along the upper wall 54 of the upper track 48. The top wall 96 of the reinforcement bracket 90 is fixedly secured to the upper wall 54 of the upper track 48 using rivets or similar fasteners as is known to those skilled in the art. The reinforcement bracket 90 extends along a portion of the predetermined length of the upper wall 54.

The top wall 96 extends laterally between J-shaped hook sections 100, 102 each having a respective, complementary locking edge 104, 106. The J-shaped hook sections 100, 102 extend downwardly from the top wall 96 into the internal channel 70. The locking edges 104, 106 overly the locking tabs 86, 88 of the anchor 78 without interfering with the anchors 78 or the lower track 28 during fore and aft movement of the upper track 48 relative to the lower track 28. Alternatively, the locking tabs 86, 88 may be integrally formed in the lower track 28 and the locking edges 104, 106 may be integrally formed in the upper track 48.

The seat track assembly 24 also includes a locking mechanism represented by positioning apertures 108, shown in FIG. 4, for selectively locking the position of the upper track 48 relative to the lower track 28, as is commonly known to those skilled in the art. Alternatively, the upper track 48 is moved relative to the lower track 28 by a continuously engaged lead screw positioner mechanism operatively coupled between the lower 28 and upper 48 tracks.

In use, the seat 10 may be adjusted between the full forward position A, the full rearward position B, and intermediate positions therebetween by first unlocking the locking mechanism, While unlocked, the seat 10 and the upper track 48 are slidable fore and aft along the lower track 28. When the seat 10 is in the desired position, the locking mechanism 108 is locked to prevent movement of the upper track 48 relative to the lower track 28. When the seat 10 is adjusted to a position within a predetermined range from the full rearward position B, the locking tabs 86, 88 overly the locking edges 104, 106. During a motor vehicle impact, an upward force urges the upper track 48 to separate from the lower track 28. In this situation, the looking edges 104, 106 of the reinforcement bracket 90 engage the locking tabs 86, 88 of the anchor 78 to control deformation between the lower 28 and upper 48 tracks and to prevent separation therebetween. As a result, a portion of the impact load associated with the weight of the seat 10 and the occupant thereof is transferred from the upper wall 54 of the upper track 48 to the lower wall 34 of the lower track 28.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A seat track assembly for providing fore and aft movement of a seat along a floor of a motor vehicle, said seat track assembly comprising:

a lower track including a generally horizontal lower wall extending between spaced apart inner side walls;

an upper track slidingly coupled to said lower track and forming an internal channel therebetween, said upper track adapted to be coupled to the seat to allow sliding movement of the seat along said lower track;

an anchor fixedly secured to said lower track within said internal channel;

a reinforcement bracket fixedly secured to said upper track within said internal channel, said reinforcement bracket selectively engaging said anchor in response to a predetermined load to control deformation and prevent separation between said lower and upper tracks;

said anchor including a base extending between an upper end for selectively engaging with said reinforcement bracket and an opposite securing end; and a track foot adapted to be fixedly secured to the floor, said track foot having a bottom surface wherein said bottom surface and said lower wall of said lower track are secured between said securing end and said base of said anchor to couple said lower track to said track foot and thereby provide for fixed securement of said lower track and said anchor to the floor of the vehicle.

2. A seat track assembly as set forth in claim 1 wherein said reinforcement bracket includes a top wall fixedly secured to and disposed along said upper track.

3. A seat track assembly as set forth in claim 2 wherein said reinforcement bracket includes hook sections extending downwardly from said top wall within said internal channel complementary to each other.

4. A seat track assembly as set forth in claim 3 wherein said upper end of said anchor includes laterally outwardly extending locking tabs disposed adjacent said hook sections such that movement of said upper track away from said lower track is prevented by said hook sections abutting said locking tabs.

5. A seat track assembly as set forth in claim 4 wherein said upper track includes an upper wall extending longitudinally along a predetermined length.

6. A seat track assembly as set forth in claim 5 wherein said reinforcement bracket extends longitudinally along a portion of said predetermined length of said upper wall.

7. A seat track assembly as set forth in claim 6 including a plurality of bushings fixedly secured to said lower track and disposed between said lower and upper tracks to reduce wear therebetween.

8. A seat track assembly as set forth in claim 7 including a plurality of roller bearings disposed between said lower and upper tracks to provide smooth movement of said upper track along said lower track.

* * * * *